ELECTROLYTIC RECOVERY OF COPPER FROM COPPER CYANIDE LEACHING SOLUTIONS
Filed March 30, 1965
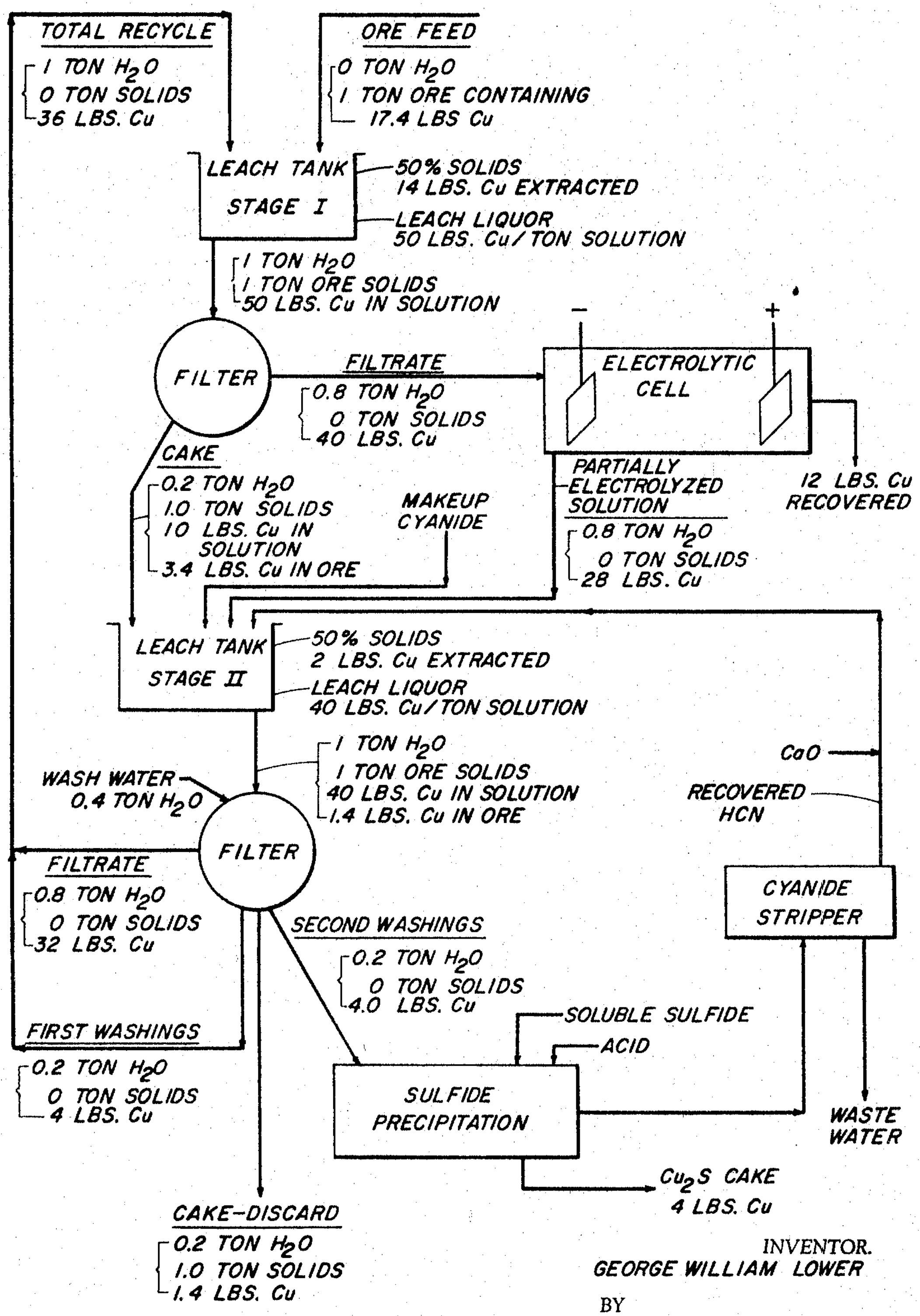
INVENTOR.
GEORGE WILLIAM LOWER
BY
Samuel Branch Walker
ATTORNEY United States Patent Office 3,463,710 Patented Aug. 26, 1969

3,463,710

ELECTROLYTIC RECOVERY OF COPPER FROM COPPER CYANIDE LEACHING SOLUTIONS

George William Lower, Bethel, Conn., assignor to American Cyanamid Company, Stamford, Conn., a corporation of Maine Filed Mar. 30, 1965, Ser. No. 443,800
Int. Cl. C22d *1/16*
U.S. Cl. 204—106 5 Claims

ABSTRACT OF THE DISCLOSURE

Copper is recovered from copper ore including ore fractions by leaching with an aqueous alkaline solution containing at least about 3 moles of cyanide per mole of copper, separating the solution from the solids, and electrolyzing the solution to recover only part of the copper directly from the solution, also regenerating cyanide. Cyanide recovery is higher if only part of the copper is electrolyzed. Less than about 50% of the copper in the solution at the time is electrolyzed. The regenerated cyanide solution is reused for leaching. At least two leaching stages, with a water wash after the second, and recycling of part of the wash, improves efficiency. Excess wash water is acidified, to release cyanide, as HCN, for vapor phase stripping and recovery, and to precipitate copper sulfide, for copper recovery.

DESCRIPTION OF THE INVENTION

The use of cyanides in other cycles to extract copper is disclosed in related patents: Lower, 3,189,435, Leaching of Copper From Ores With Cyanide and Recovery of Copper From Cyanide Solutions; Martinez, 3,351,193, Recovery of Molybdenite From Copper-Bearing Ores; Snell, 3,357,900, Recovery of Hydrogen Cyanide From Acidic Aqueous Cyanide Solutions Containing Suspended Solids; Cadwell, 3,386,572, Upgrading of Copper Concentrates From Flotation; Lower, 3,403,020, Leaching of Copper From Ores With Cyanide and Recovery of Copper From Cyanide Solutions; and Lower, 3,429,694, Extraction of Copper From Cyanide Solution With Quaternary Amines and Phosphonium Compounds.

This invention relates to the recovery and recycling of cyanide in processes for the beneficiation of copper-containing ore and ore fractions, including slags, particularly processes in which copper is dissolved from mineral components in an aqueous cyanide-containing solution, and the copper is recovered from the solution by electrolysis with the regeneration of cyanide in a form suitable for leaching copper from the ore fraction.

Cyanide has long been used for the recovery of gold from gold ores, by leaching of the ore. In a gold leach, the presence of oxygen is essential, the leach is for at least about 24 to 48 hours, and copper has been regarded as a cyanicide, that is, cyanide is consumed in the process, resulting in a loss of cyanide, and increasing costs. The recovery of copper by cyanide leaching, in the absence of noble metal values, has not been considered economically feasible.

At present copper sells at about 32 to 34 cents per pound. Sodium cyanide sells at about 18 to 20 cents per pound.

Although copper can be dissolved by cyanide, if the cyanide losses are too high, extraction of copper by cyanide is not economically practical.

The present method of recovery and recycling cyanide employs more cyanide than would be economically practical, if lost, but enough cyanide is recovered for reuse so that the process renders practical and economical the cyanidation of copper ores to extract and recover copper.

Where not otherwise limited by context, the term "ore fraction" is intended to include the ores themselves, as mined, crushed or ground to treatable size, both rich and lean, as well as selected portions such as fines or slimes from any of the grinding operations, before or after flotation, sands or any sand fractions of any size in which the reduction of ore particles is small enough that an economic fraction of the copper-containing minerals are exposed to action by reagents, cleaner tailings, rougher tailings, rougher concentrates, cleaner concentrates, and slags, including converter slags and reverberatory slags. With slags, grinding or other methods of attrition may be necessary in order that the subdivision be fine enough to permit attack on the individual copper bearing particles by cyanide solution.

The ore fraction may contain both sands and slimes. The slimes are the finely-divided, difficultly-filterable particles, which frequently are difficult to handle because of the large surface to weight ratio. Sands are larger particles, usually from a classification step, frequently using a cyclone, and are more amenable to flotation. Hence, circuits are useful in which the slimes are treated directly with cyanide leaching, and the sands are floated, with part or all of the concentrate sent to the smelter as in conventional processing, and with part of the tailings, or cleaner tailings being treated by cyanide leaching. The economics of cyanide leaching of each fraction may be separately considered. The preferred circuit varies with the type of ore treated, the richness of ore, and availability of water, cyanide, and electric power. The most economical circuit for a specific ore or ore fraction can be chosen using the principles set forth herein as applied to the conditions that prevail at a specific ore processing operation.

The present process gives good results with sulfide ores, oxide ores and mixed ores.

As used herein, the term "sulfide ores" includes the more common sulfide minerals, such as chalcocite ($Cu_2S$), digenite ($Cu_9S_5$), and covellite ($CuS$), as well as mixed sulfides such as bornite ($Cu_5FeS_4$), enargite ($Cu_3AsS_4$), and tetrahedrite ($Cu_{12}Sb_4S_{13}$).

The term "oxide ores" is used to cover the ores in which the copper occurs as an oxide or carbonate such as azurite ($CuCO_3 \cdot Cu(OH)_2$), malachite ($Cu_2(OH)_2CO_3$), cuprite ($Cu_2O$), tenorite ($CuO$), and forms of chrysocolla, which is a silicate mineral of copper.

The term "mixed ores" is used to cover ores in which the copper occurs as both sulfide minerals and oxide minerals and the proportion of each is large enough that for reasonably economic recovery both types of copper minerals need to be considered in the metallurgy. Sulfide ores which are completely free from oxide, or oxide ores which are completely free from sulfides are unusual. Ores exist in which the proportion of oxides in a sulfide ore or sulfide in an oxide ore is so low that for metallurgical recovery purposes the ore may be considered as essentially the sulfide or an oxide type. Similarly, in working with slags the same classification can be used and in working with ore fractions the same terminology is applicable.

Fortunately, in the present process, minor modifications in ratios only are required to provide for sulfide, oxide and mixed ores and, in general, any of the ore fractions may be treated rapidly, efficiently and effectively by adjusting the quantity of reagents in accordance with the present invention so that sufficient cyanide is present to dissolve all of the recoverable copper in the particular ore fraction.

It is to be understood that in some ores part of the copper is present in inclusions so fine that it is uneconomical to grind the ore fine enough to release all of the copper and such inclusions can be considered as non-recoverable copper.

As is obvious to those skilled in the art, the exact proportions, ratios, and treatments, including the choice of crude calcium cyanide, gaseous hydrogen cyanide, or alkali or alkaline earth cyanide, including ammonium cyanide, or organic α-hydroxy cyanides such as lactonitrile, as well as the grinding, water ratios, and other operating parameters are a function of economics and vary from time to time and mine to mine.

The present invention is based on the discovery that the copper values of ore fractions may be leached from the gangue and other minerals by an aqueous alkaline cyanide so that the copper is present in solution as predominantly a soluble cuprocyanide.

The soluble cuprocyanide is electrolyzed to separate the copper at the cathode as metallic copper, and the cyanide is in large part recovered in the form of a cyanide ion in solution, which solution is reused to leach additional quantities of the ore. For best cyanide recovery, only part of the cuprocyanide is electrolyzed. Part of the cyanide appears to be converted to cyanate, and if electrolysis proceeds too far, the loss of cyanide by conversion to cyanate appears to increase, other conditions being unaltered. The cyanide in solution, including copper not plated out is recycled to the cyanide leaching operations.

The reactions in electrolysis include:

$$Cu(CN)_3^{=} \xrightarrow{+e} Cu^{\circ} + 3CN^{-}$$

$$(CN)^{-} + 2OH \xrightarrow{--2e} CNO^{-} + H_2O$$

Combined and balanced:

$$2Cu(CN)_3^{=} + CN^{-} + 2OH^{-} \rightarrow 2Cu^{\circ} + CNO^{-} + 6CN^{-} + H_2O$$

and cancelling the extra cyanide the overall reaction becomes:

$$2Cu(CN)_3^{=} + 2OH^{-} \longrightarrow 2Cu^{\circ} + 5CN^{-} + CNO^{-} + H_2O$$

A competing cathode reaction is:

$$2H_2O \xrightarrow{+2e} H_2\uparrow + 2OH^{-}$$

As copper undergoes a single electron change, the basic reaction requires less electric current than acid electrowinning or electrorefining where a two electron change occurs.

If the electrolysis depletes the copper, the relative generation of hydrogen increases, with a concomitant consumption of cyanide and production of cyanate. Hence, the electrolyzed liquid is in effect only electrolyzed partly and recycled to leach.

As water is used to wash the leached ore, and recovered copper and cyanide absorbed or trapped in the ore, and the copper and cyanide rich portions of such wash water added as a replacement for entrainment losses, a bleed stream to remove water and accumulated impurities becomes desirable. This may be at any chosen part of the cycle, but is conveniently after the leaching operation, with part of the wash water being treated to separate cyanide and copper. An alternative bleed point is the effluent from the electrolytic cell. One convenient system to recover values from the bleed stream is to add at least enough of a soluble sulfide that when considered with the sulfides already present, a stoichiometric excess is present and then acidify to precipitate cuprosulfide, which is separated and smelted. The acidified solution containing HCN is steam or air stripped of HCN, which is absorbed or condensed, alkalized with lime, and added to the leach circuit.

In the leaching of the ore, countercurrent techniques, washing techniques, and electrolytic techniques long known to the mining industry, are usually, but not necessarily, used. In the leaching operation a short time, well under an hour, is adequate for solution of copper by the cyanide. Somewhat longer contact may be used where from plant considerations, immediate treatment is not convenient.

In leaching operations a comparatively high solids ratio is usually preferred for countercurrent leaching, followed by countercurrent washing so that the discarded gangue has a minimum content of cyanide. Depending upon the ore and the size of subdivision, conventional thickeners or filters are used to separate the leach solution and wash water. Multi-stage leaching and multi-stage washing reduce losses, but add to treatment costs, so an economic compromise is used commercially.

It is to be understood that the choice of processing can vary with the degree of richness of the ore fraction being treated, as well as the physical particle size which controls the convenience of liquid-solid separation and flotation.

All operations can be performed at ambient temperatures and pressure, from about 5° C. for cold areas in winter to about 35–40° C. for hot areas in summer. The pressure can be normal sea level atmospheric, or the reduced pressure of high altitude mines. Pressure vessels and/or higher pressures and /or temperatures are useful, but increased leaching rates, and increased filtering or settling rates frequently may not be of sufficient economic value to pay for the cost of heat.

Ores containing chrysocolla, a copper silicate $$(CuSiO_3 \cdot H_2O)$$

and related silicates are more effectively leached while hot. Hence, this difficultly treatable mineral makes a more substantial contribution in ores treated by the present process with hot leaching.

If by-product or waste heat is available, hot leaching becomes more advantageous economically.

Chalcopyrite ($CuFeS_2$) leaches more slowly than most copper minerals. It is extremely easy to float, so that a flotation of chalcopyrite before or after and in addition to the cyanide leach can offer a combined treating step flow sheet of commercial value. The cyanide leach frees the chalcopyrite so that a subsequent flotation gives good recoveries, particularly if particles of copper minerals in the ore are masked by more cyanide soluble fractions.

In conventional cyanide treatment of precious metal ores, the gold and silver are displaced by zinc, and separately recovered. In the present process the precious metals, if present, plate out with copper from the cyanide solution, and can be recovered as slimes if an acid electrorefinery step is used to additionally purify the copper.

The cation associated with the cyanide is not important. For purposes of calculation and expression, even if added as calcium cyanide, crude or pure, or free hydrogen cyanide or otherwise; to express the quantities added, it is convenient to calculate all forms of cyanide as sodium cyanide equivalent, and the examples are so written.

Roughly, 50 pounds of sodium cyanide (NaCN) equals 46 pounds of calcium cyanide ($Ca(CN)_2$) or equals 27 pounds of hydrogen cyanide (HCN).

The leaching operation can be continuous or staged. If continuous, the ore and leach liquor can be fed together into the tank to produce sufficient time for the interaction while passing through the leach tank. Conveniently, rather than a continuous feed, a plurality of tanks can be used in which each tank is filled and emptied in turn.

Conveniently, proportions are expressed per ton of ore and per ton of leach solution. The relative ratio of leach solution to the ore depends in part upon the type of ore and the physical state of subdivision of the ore. If the ore is finely ground a suspending agent, such as a high molecular weight polyacrylamide, may be necessary to keep the slime particles from settling out and blocking impellers. With a coarse ore, such as about −65 mesh and very little under 300 mesh, the leach solution can be permitted to percolate through the ore. All of such operations are well known to the mining industry and further details would obscure rather than exemplify the present invention.

The attached drawing shows a representative flow sheet at which the liquid to solid ratio is 1 ton of leach liquor to 1 ton of ore. If less than about one-half ton of leach liquor is used per ton of ore the slurry becomes unduly thick and hard to handle and if more than about 3 tons of leach liquor are used per ton of ore the volume of liquid to be handled starts to become unduly great. It is to be appreciated that the exact quantities for best results vary with characteristics of the ore.

By having a rather strong leach liquor as feed to electrolysis better efficiencies are obtained. If more than 50% of the copper is recovered during electrolysis, cyanide consumption tends to become uneconomically high and if less than 10% to 15% of the copper is recovered the rate of recycling of the leach liquor may become uneconomical although if adequate filter capacity is available there is no lower limit on the amount of copper which can be electrolyzed as the leach liquor is recycled. It is preferred that the electrolyte feed have practically no initial free cyanide as current efficiency falls with the increase in free cyanide. This is in addition to the loss of cyanide as cyanate during the electrolysis from the reaction of choice.

Example 1

An oxidizer copper ore containing cuprite ($Cu_2O$) was leached in two stages at 50% solids for 30 minutes per stage at room temperature of about 20° C. with crude calcium cyanide at a molar ratio of cyanide (NaCN equivalent) to copper of 3:1 until a steady state was reached at a copper concentration of 50 pounds of copper per ton of leach solution in the first stage. Fresh ore was added to stage 1.

Ore solids were drawn from stage 1, continuously, filtered, and repulped and leached in stage 2. The strong pregnant solution (50 lbs. Cu/T) containing only 0.1 lb. free sodium cyanide equivalent per ton was electrolyzed at a cathodic current density of 0.93 ampere per square decimeter and 2.3 volts to recover copper metal. Thirty percent of the copper from the electrolyte feed was plated out and separated at a current efficiency of 70.0% and a power consumption of 0.66 kilowatt hours per pound of copper. Cyanide equivalent to 70% of the copper recovered electrolytically was released as free cyanide in the partially spent electrolyte. This partially spent electrolyte was added to leaching stage 2. After 30 minutes leaching, the ore solids were filtered. The filtrate from stage 2 was recycled to stage 1. The leached residue from stage 2 was washed with 0.4 ton of water per ton of ore. Part of this wash water containing 4.0 lbs. Cu plus cyanide was treated with 0.4 lb. NaHS/lb. Cu and acidified to pH 3.0 with $H_2SO_4$. Over 99% of the copper was recovered as a copper sulfide cake.

The cyanide was steam stripped from the acidified slurry as HCN, mixed with an equivalent amount of lime and added to leach stage 2. Unless the pH is kept on the alkaline side, the solutions must be kept in closed vessels to prevent the escape of toxic HCN. Cyanide recovery was 98.9%.

Makeup cyanide equivalent to about 0.7 lb. NaCN equivalent per pound of copper recovered was also added (as crude calcium cyanide) to leach stage 2. Copper extraction from the ore was 92%.

The accompanying flow sheet shows a typical mill operation expressed in relationships per ton of ore solids. An ore containing 17.4 pounds of copper, expressed as metallic copper, per ton is fed to a leach tank and after sufficient time operation to attain a stable circuit, the leach tank contains 50% solids with the leach liquor containing 50 pounds of copper per ton of solution including 14 pounds of copper extracted per ton of ore. The 50% solids suspension is filtered. About 0.8 ton of filtrate can be separated containing effectively no solids and 40 pounds of copper, which is fed to an electrolytic cell. In the electrolytic cell 12 pounds of copper is plated out, leaving a partially electrolyzed solution having 0.8 ton of water and 28 pounds of copper, which is fed back to the leach tank of the second stage. The cake from the filter containing about 0.2 ton of water, 1 ton of ore solids having about 10 pounds of copper in solution and 3.4 pounds of copper unextracted in the ore is added to leach stage 2. Additionally, makeup cyanide as crude calcium cyanide is added to make up losses. About 2 pounds of copper is extracted in the second leach tank. The slurry fed to the second stage filter contains 1 ton of water, 1 ton of ore solids, 40 pounds of copper in solution, and has 1.4 pounds of copper undissolved in the ore. After filtration the filtrate consisting of 0.8 ton of water, no solids, and 32 pounds of copper is recycled to stage 1. The filter cake is washed with 0.4 ton of water, half of which containing about 4 pounds of copper is recycled with the filtrate to the first leach stage, thus giving a total of 1 ton of water to the first leach stage and 36 pounds of copper in recycle. The cake which contains about 0.2 ton of water, 1.0 ton of solids and 1.4 pounds of copper is discarded. The second half of the wash water containing about 0.2 ton of water and 4 pounds of copper is treated with sufficient of a soluble sulfide such as sodium hydrosulfide (NaHS) that a stoichiometric equivalent of sulfide, including sulfide already present, is available so that on acidification the copper comes out as a cuprosulfide cake containing about 4 pounds of copper, which can be smelted by conventional means. The residual wash water is run through a cyanide stripper where the HCN is steam stripped, condensed, and sufficient lime added to alkalize the solution. The alkaline calcium cyanide in solution is fed back to the second stage leach tank. Waste water is discarded. Safety demands that all air around the plant have a maximum of 10 parts per million HCN. Hence, all cyanide-containing solutions should be alkaline, preferably at a pH of about 10 or above, or they should be in air-tight vessels so that HCN cannot escape to the atmosphere. HCN is explosive in air in the ratio of about 6% to 41%, but usually the toxicity is the critical factor.

Whereas this example sets forth a representative flow rate, it is to be appreciated that the size of the tanks and the actual rate is usually many tons of ore per hour, depending upon feed available, and the exact control points in the various steps is to be optimized by such adjustments as are necessary, depending on a specific ore being processed.

Example 2

A rich cuprite ($Cu_2O$) ore was leached counter-currently in three stages with crude calcium cyanide in such a manner that in the head stage, or stage 1 (where the fresh ore enters), there was excess copper over free cyanide available so that the resulting pregnant solution contained low free cyanide, 0.1 g./l. as NaCN. The overall cyanide to copper ratio in the leaching circuit was 3.0 moles NaCN equivalent per mole of Cu. Leaching time was 45 minutes (15 minutes per stage).

Copper extraction was 92.2%. The resulting pregnant solution contained 24.1 g. Cu/l., 0.1 g. free NaCN equiv./l., and 42.0 g. total cyanide as NaCN equiv./l. Electrolysis of this pregnant solution for 6 hours at a current density of 0.93 ampere per square decimeter and a voltage of 2.3 volts resulted in recovery of 29.1% of the copper as copper metal at a current efficiency of 70.0% and a power consumption of 0.66 kilowatt hours per pound of copper (equivalent to 1.52 lb. Cu/kwh.). The resulting recycle electrolyte contained 17.6 g. Cu/l. and 9.4 g. free cyanide as NaCN equiv./l. This is 70.1% of the cyanide released from the cuprocyanide complex during electrolysis, becomes available as free cyanide, for the dissolution of additional copper upon recycling this spent electrolyte to the leaching circuit.

The partially spent electrolyte was recycled to the leach operation and makeup cyanide, as crude calcium cyanide was added to the third or tail stage to extract the final copper from the ore. The discharged ore was counter-currently washed and the washings added to the third stage, to avoid losses of cyanide or copper with the spent ore.

A feed stream, equal to the added wash water, was taken from the partially spent electrolyte stream, with soluble sulfide being added as required, then acid to permit the separation of cuprosulfide, and vapor phase stripping of cyanide as HCN from the copper free acidified discharge from the separation step.

Example 3

A chalcocite ore ($Cu_2S$) was leached in two stages with crude calcium cyanide in such proportions that the last stage contained more copper in the ore than could be dissolved by the free cyanide present. During the leaching period the cyanide-ore slurry was aerated in order to eliminate sulfide and thus allow the free cyanide present to dissolve additional copper and at the same time produce a pregnant solution containing a low free cyanide level. The pregnant solution thus produced contained 13.7 g. Cu/l., 31.0 g. total cyanide as NaCN equiv./l. and 0.6 g. free cyanide as NaCN equiv./l. Copper extraction from the ore was 80.2%.

The above pregnant solution was electrolyzed for 6 hours at a current density of 0.47 ampere per square decimeter and a voltage of 2.0 volts. A copper recovery of 23% was obtained at a current efficiency of 71.7% with a power consumption of 0.61 kilowatt hour per pound of copper (equivalent to 1.64 lb. Cu/kwh.).

The spent electrolyte contained 5.88 g. free NaCN equivalent which is 71.1% of the free cyanide released by reduction of the cuprocyanide complex. Recycle of this spent electrolyte solution to the head of the leaching circuit allowed the free cyanide to dissolve additional copper.

The above examples are illustrative of this invention, which is defined in the following claims.

I claim:

1. A process for recovering cyanide for use in the recovery of copper from copper-containing ore fractions, comprising: leaching in at least one stage, a copper-containing ore fraction with aqueous alkaline soltuion containing a total of at least about three moles of cyanide per mole of extractable copper, thereby dissolving a major portion of the copper as cuprocyanide, separating the alkaline aqueous liquid containing the dissolved copper as cuprocyanide from the cyanide insoluble residue, passing an electric current through the separated alkaline aqueous liquid, plating out not more than about 50% of the copper in the solution at the time on the cathode, while regenerating at least part of the cyanide from the cuprocyanide as soluble cyanide ions, and recycling the solution containing the regenerated soluble cyanide ions and copper not electrolyzed thus produced to the said leaching operation.

2. The process of claim 1 in which at least about 10% and not more than about 50% of the copper in the cuprocyanide solution is plated out.

3. In the recovery of copper from a copper-containing ore fraction by leaching said ore fratcion with an aqueous alkaline solution containing cyanide ions, in combination therewith the improvement which comprises: the step of recovering cyanide by separating the alkaline aqueous liquid containing the dissolved copper as cuprocyanide from the cyanide insoluble residue, and passing an electric current through the thus separated alkaline aqueous liquid thus plating out not more than about 50% of the copper in the solution at the time on the cathode while regenerating at least part of the cyanide from the cuprocyanide as soluble cyanide ions.

4. The process of claim 3 in which at least about 20% and not more than about 50% of the copper in the cuprocyanide solution is plated out.

5. The process of claim 4 in which residual copper in at least a portion of the electrolyzed aqueous alkaline cuprocyanide solution is recovered by adding sufficient sulfide that the solution contains a stoichiometric sufficiency of sulfide, including sulfide already present, to permit precipitation of copper as cuprosulfide, acidifying the solution to precipitate the copper as cuprosulfide, separating the precipitated cuprosulfide, and vapor phase stripping residual cyanide as HCN from the acidified liquor.

References Cited

UNITED STATES PATENTS

| | | | |
|---|---|---|---|
| 730,835 | 6/1903 | Beatty | 75—105 |
| 1,578,618 | 3/1926 | Welch | 75—105 |
| 2,520,703 | 8/1950 | Wagner | 204—106 |
| 2,655,472 | 10/1953 | Hilliard et al. | 75—105 |
| 2,876,178 | 3/1959 | McCoy | 204—52 |
| 689,018 | 12/1901 | Orr | 204—106 |
| 759,220 | 5/1904 | Porter | 204—106 |
| 1,226,190 | 5/1917 | Cox et al. | 204—106 |
| 3,224,835 | 12/1965 | Hockings et al. | 23—135 |

FOREIGN PATENTS 801,460 9/1958 Great Britain.

JOHN H. MACK, Primary Examiner

H. M. FLOURNOY, Assistant Examiner